United States Patent
Reichhart

(10) Patent No.: US 8,504,447 B2
(45) Date of Patent: Aug. 6, 2013

(54) METHOD FOR TRIGGERING A COST ENTRY

(75) Inventor: Thomas Reichhart, Aldenhoven (DE)

(73) Assignee: Hewlett-Packard Gesellschaft m.b.H., Vienna (AT)

( * ) Notice: Subject to any disclaimer, the term of this patent is extended or adjusted under 35 U.S.C. 154(b) by 571 days.

(21) Appl. No.: 11/722,396

(22) PCT Filed: Dec. 2, 2005

(86) PCT No.: PCT/EP2005/012895
§ 371 (c)(1),
(2), (4) Date: Jun. 21, 2007

(87) PCT Pub. No.: WO2006/066709
PCT Pub. Date: Jun. 29, 2006

(65) Prior Publication Data
US 2009/0265259 A1  Oct. 22, 2009

(30) Foreign Application Priority Data
Dec. 21, 2004  (DE) .......... 10 2004 062 784

(51) Int. Cl.
*G07B 17/00* (2006.01)
*G07F 19/00* (2006.01)
*G06Q 40/02* (2012.01)

(52) U.S. Cl.
CPC ................. *G06Q 40/02* (2013.01)
USPC ............................. 705/30; 705/33

(58) Field of Classification Search
USPC .................. 709/101; 379/112.01
See application file for complete search history.

(56) References Cited

U.S. PATENT DOCUMENTS

| | | | |
|---|---|---|---|
| 7,028,303 B2* | 4/2006 | Lahey et al. .................. | 718/106 |
| 7,228,346 B1* | 6/2007 | Allavarpu et al. ............ | 709/223 |
| 2002/0194245 A1* | 12/2002 | Simpson et al. .............. | 709/101 |
| 2003/0018567 A1* | 1/2003 | Flitcroft et al. ................ | 705/37 |
| 2004/0062370 A1* | 4/2004 | O'Neal et al. ........... | 379/112.01 |
| 2004/0070781 A1* | 4/2004 | Matsugi ....................... | 358/1.14 |
| 2004/0215565 A1* | 10/2004 | Huffman ........................ | 705/42 |

FOREIGN PATENT DOCUMENTS

EP  1 128 278 B1  9/2003

OTHER PUBLICATIONS

JDF Specification Release 1.1, Apr. 30, 2002.
J. Harvey, JDF: Where to Begin, Apr. 30, 2002.
Doug Belkofer et al.: Digital Smart Factory Forum 2002, Orlando, Florida Mar. 6-8, 2002.
KBA-Report 24—Sep. 2004.
JDF Specification CIP4, 2003.
Total Networking. Implementing CIM and end-to-end workflows with JDF, 2004.

* cited by examiner

*Primary Examiner* — F. Zeender
*Assistant Examiner* — Denisse Ortiz Roman

(57) ABSTRACT

A method for triggering a cost entry in the context of a job is disclosed, which is issued by a management information system, and executed on an execution system, wherein the execution system transmits job related status reports in Job Definition Format to the management information system, and wherein incoming status reports are stored on the management information system.

In order to allow cost entries after the completion of particular processes in the context of a job, it is being suggested that status reports arriving at the management information system are stored, categorized through a parser, and that a cost entry is triggered, when a status report is stored as cost relevant.

15 Claims, 1 Drawing Sheet

| | |
|---|---|
| //JMF/Response[@Type="SubmitQueueEntry"] | createJob |
| //JMF/Signal/ResourceInfo/ApprovalSuccess | pageApproval |
| //JMF/Signal/ResourceInfo/ExposedMedia | prepressOperation |
| //JDF | jdf |
| //JMF | other |

Fig. 1

| | |
|---|---|
| //JMF/Response[@Type="SubmitQueueEntry"] | createJob |
| //JMF/Signal/ResourceInfo/ApprovalSuccess | pageApproval |
| //JMF/Signal/ResourceInfo/ExposedMedia | prepressOperation |
| //JDF | jdf |
| //JMF | other |

Fig. 2

| path | CC | WC | Time | Mat | Qnt | ID |
|---|---|---|---|---|---|---|
| --- plate --- | | | | | | |
| //jdf:ExposedMediaLink and //jdf:Media[contains(@UserMediaType,"Fortis")] | 1003 | 30 | 0.1 | 555 | 1.0 | 503 |
| //jdf:ExposedMediaLink and //jdf:Media[contains(@UserMediaType,"PTP")] | 1003 | 30 | 0.1 | 555 | 1.0 | 503 |
| //jdf:ExposedMediaLink and //jdf:Media[contains(@UserMediaType,"Mirus")] | 1003 | 30 | 0.1 | 555 | 1.0 | 503 |
| --- page proof --- | | | | | | |
| //jdf:ExposedMediaLink and //jdf:ExposedMedia[@ProofType="Page"] and //jdf:Media[contains(@UserMediaType,"Veris")] | 1310 | 30 | 0.1 | 38 | 1.0 | 503 |
| --- form proof --- | | | | | | |
| //jdf:ExposedMediaLink and //jdf:ExposedMedia[@ProofType="Imposition"] and //jdf:Media[contains(@UserMediaType,"Integris")] | 1310 | 30 | 0.1 | 38 | 1.0 | 503 |

METHOD FOR TRIGGERING A COST ENTRY

BACKGROUND OF THE INVENTION

The invention relates to a method for triggering a cost entry in the context of a job, which is issued by a management information system, and executed on an execution system, wherein the execution system transmits job related status reports in Job Definition Format to the management information system, and wherein incoming status reports are stored in the management information system.

The Job Definition Format "JDF" (and the Job Messaging Format "JMF", as a subset of JDF) are generally known data formats, which have been developed and are being maintained by the consortium "International Cooperation for the Integration of Processes in Prepress, Press and Postpress" ("CIP4-Consortium", www.cip4.org). The development of JDF is based on the objective to standardize the communication between print shop, designer, advertising agency, customer for printed matters, and sub vendors of contractors in the context of a networked graphic production for all production options and eventualities in a flexible manner and without restrictions.

JDF is based on the extensible markup language "XML", a meta language, which is also generally known and developed by the World Wide Web Consortium ("W3C", www.w3.org) for defining document types and, according to the intentions of the CIP4-Consortium, and is to serve as a standard data format for describing processes and products, not only in all production areas of a networked print shop, in particular in sales, job costing, and order processing, production planning and control in the regular production, in preproduction, print, print post processing, and shipping, in the cross sectional areas, materials and warehouse management, financial and payroll accounting, controlling, cost accounting, and quality assurance.

Through vertical integration of data, on the one hand of the production process, and on the other hand of the accounting sectors, JDF shall facilitate a standardized documentation of the relevant target and actual data, and seamless production control. In particular, a JDF job shall only be described once in one form, which all process participants understand, also in external communications with customers and subcontractors and their execution systems in the man-machine and machine-machine communication over all language and platform boundaries.

According to the philosophy of the CIP4-Consortium, and the concept of JDF based thereupon, status information with respect to the processes performed in the context of a job, is being stored in the "audit pool" structure of a JDF file, and collected and analyzed through post calculation after completing the job.

In generally known methods of the said kind, cost entries are triggered as soon as an operator indicates the completion of a process in the context of processing an order, through business data recording on notepads, or in a BDE terminal.

It is the object of the invention, to propose another method for cost entries after the completion of a single process.

SUMMARY OF THE INVENTION

Based on the known methods, it is suggested according to the invention that the status reports arriving at the management information system are stored, categorized through a parser, and that a cost entry is triggered, when a status report is stored as cost relevant.

On the side of the management information system for implementing the process, according to the invention, e.g., a simple proxy server can receive and store JMF status reports, which can be transmitted via the "HyperText Transfer Protocol" (HTTP), or via another communication scheme, through which data can be transferred from one computer to another.

The use of JMF status reports for cost entries contradicts the philosophy of the CIP4-Consortium, as it is stated in "JDF Interoperability Conformance Specification" (MIS ICS 1.0, draft dated Oct. 26, 2004). After this ICS, it is recommended for safety reasons to use only "audit pool" elements of the JDF file for cost entries, and to use all information from JMF status reports only for progress control of the processes and for utilization statistics of the execution systems. Only based on the JMF nodes "DeviceInfo" and "JobPhase", a cost entry is allowed, but under the expressed prerequisite that an execution system complying with the requirement of this ICS does not have to guarantee the completeness of the information of these fields.

The triggering of the cost entry can be completely decoupled on a program level from receiving and storing status reports (in the example by the proxy server) in the context of the method according to the invention. For receiving the status reports and for triggering a cost entry, only the location of the storage has to be available, and the configuration of the storage has to be known as an interface definition. Through allowing a modular operating mode, the method according to the invention is characterized, on the one hand, through high flexibility, and on the other hand through high reliability.

When the incoming status reports are stored in a temporary manner by the module, designated for receiving and storing the status reports, at a first storage location in the sense of a cache, also the categorization of the incoming status reports can be implemented again as a separate module. In case of a failure of the module for the categorization the receipt and storage of the status reports is not impaired. Also, the cost entry remains functional (though possibly in an obsolete state).

In a preferred embodiment of the method according to the invention, each status report, which is categorized as cost relevant, is stored in an area that is monitored by an entry module, and the entry module then triggers a cost entry, when a status report was stored in the monitored area.

The incoming status reports can, e.g. be stored as JMF files in one or several "hot folders", whose content in the context of the management information system is monitored for changes for triggering a cost entry by an application running as an entry module in the background, a so-called "disk and execution monitor" (in workstation operating systems mostly called a "daemon", in PC operating systems called a "service"). Storing a status report, which is categorized as cost relevant, in the monitored "hot folder" can then trigger a cost entry. Storing the status reports in a file system constitutes a particularly simple implementation of a database structure. Alternatively, also the use of other forms of databases is possible in principle.

In another advantageous embodiment of the process according to the invention, the status report is moved from the monitored area into a storage area, after completing the cost entry. Through these measures, the entries that have already been performed can simply be differentiated from the entries that still have to be performed, after a failure of the entry module. Furthermore, the database of the entries already performed can simply be checked, when necessary, from the status reports that were already moved into the storage area, or it can even be constructed new again in its entirety.

BRIEF DESCRIPTION OF THE FIGURES

The invention is subsequently described with reference to an exemplary embodiment. It is shown in:

FIG. 1 a list of fields and associated directory names; and

FIG. 2 a list of logically interlinked field contents and associated business parameters.

DETAILED DESCRIPTION OF PREFERRED EMBODIMENTS

In a networked print shop, partial processes of jobs are processed on different execution systems; the control and monitoring of order processing is a task of a management information system. The business accounting for the jobs is performed in a separate cost module.

The execution systems connected to the management information system send JMF status reports via HTTP to a proxy server, which stores them in a special directory tree on a file server. A module is integrated into the proxy server, which categorizes the incoming status reports according to partial jobs and -processes, and initiates the storage in directories specified in the same table in the directory tree. The XML fields used by the proxy server for categorizing the status reports are specified in a text file according to the table in FIG. 1.

In a second module, the XML field contents of the status reports, specified according to the table in FIG. 2 in the text file, are being evaluated. If in one status report one of the logic conditions, defined in the column designated "path" according to FIG. 2, is fulfilled, the status report is categorized as cost relevant, and the respective file is stored in a hot folder "costs" in the directory tree of the respective job on a central server.

When starting the separate cost module, the hot folders "costs" for the processed jobs are being read. In case a file is located in a hot folder, it is in turn checked by a parser, if one of the logic conditions, defined in the column designated as "path", according to FIG. 2, is fulfilled. If this is the case, the cost module triggers a cost entry with the business parameters defined in the same line of the text file (CC: "cost chapter", WC: "work process", time: "time to be billed", mat: "material number", qnt: "quantity", and ID: personnel number), and subsequently moves the file into a storage directory "saved".

What is claimed is:

1. A method for triggering a cost entry in the context of a job, which is issued in a networked print shop by a management information system, comprising:

executing an application to continuously run as an entry module in a background on an operating system in a management information system, wherein the application monitors a cost relevant area in data storage for newly stored status reports in the cost relevant area;

subsequently receiving, at the management information system, a job related status report in Job Definition Format from an execution system;

categorizing the status report into one of multiple categories with a parser, wherein the multiple categories include at least one cost relevant category and at least one category that is not cost relevant;

when the status report is categorized to the at least one cost relevant category, storing the status report to the cost relevant area;

when the status report is stored in the cost relevant area, the application, in response to its monitoring of the cost relevant area, triggering a cost entry; and when the status report is categorized to the at least one category that is not cost relevant, storing the status report in another area in the data storage outside the cost relevant area.

2. The method according to claim 1, further comprising:

moving the status report from the cost relevant area into a storage area after completion of the cost entry.

3. The method according to claim 1, wherein the triggering of the cost entry is decoupled from a program performing the receiving and the storing of the status report.

4. The method according to claim 1, wherein the job includes plural partial processes that are processed on different execution systems.

5. The method according to claim 1, comprising:

storing a table specifying a directory tree, and the table includes fields for status reports and a corresponding directory in the directory tree for each field;

prior to the storing of the status report in the cost relevant area or the another area in the data storage, identifying a field from the status report that is in the table and storing the status report in one of the directories specified in the table that corresponds to the identified field.

6. The method according to claim 5, wherein the fields in the table include a field for creating jobs, a field for page approval, a field for pre-press operation, and a field for job definition format.

7. The method according to claim 5, wherein the storing of the status report to the cost relevant area comprises:

storing the status report from the one of the directories into the cost relevant area, wherein the cost relevant area comprises a costs folder in the one of the directories.

8. The method according to claim 1, wherein the triggering of the cost entry comprises:

the application, in response to its monitoring of the cost relevant area, triggering the parser to determine if a logic condition in a field in the status report is satisfied, and triggering the cost entry in response to the parser determining the logic condition is satisfied.

9. The method according to claim 8, comprising:

identifying parameters for the field in the status report, and including the parameters in the cost entry, wherein the parameters include cost chapter, work process, time to be billed and ID.

10. A method comprising:

executing an application to monitor a cost relevant area in data storage for newly stored status reports in the cost relevant area;

receiving, at a management information system, job related status reports from execution systems;

determining whether the status reports fall into a cost relevant category or a category that is not cost relevant;

in response to a status report of the status reports falling into the cost relevant category, storing the status report to the cost relevant area; and when the status report is stored in the cost relevant area the application, in response to its monitoring of the cost relevant area, triggering a cost entry, wherein the triggering of the cost entry includes determining if a logic condition in a field in the status report is satisfied, and triggering the cost entry in response to determining the logic condition is satisfied.

11. The method according to claim 10, wherein the triggering of the cost entry comprises:

identifying parameters for the field in the status report, and including the parameters in the cost entry.

12. The method according to claim 11, wherein the parameters include cost chapter, work process, time to be billed and ID.

13. The method according to claim 10, comprising:
   storing a table specifying a directory tree, and the table includes fields for status reports and a corresponding directory in the directory tree for each field; and
   prior to the storing of the status report in the cost relevant area, identifying a field from the status report that is in the table and storing the status report in one of the directories specified in the table that corresponds to the identified field.

14. The method according to claim 13, the storing of the status report to the cost relevant area comprises:
   storing the status report from the one of the directories into the cost relevant area, wherein the cost relevant area comprises a costs folder in the one of the directories.

15. The method according to claim 13, wherein the fields in the table include a field for creating jobs, a field for page approval, a field for pre-press operation, and a field for job definition format.

\* \* \* \* \*

UNITED STATES PATENT AND TRADEMARK OFFICE
CERTIFICATE OF CORRECTION

| | |
|---|---|
| PATENT NO. | : 8,504,447 B2 |
| APPLICATION NO. | : 11/722396 |
| DATED | : August 6, 2013 |
| INVENTOR(S) | : Thomas Reichhart |

It is certified that error appears in the above-identified patent and that said Letters Patent is hereby corrected as shown below:

In the Claims

In column 4, line 57, in Claim 10, delete "area" and insert -- area, --, therefor.

In column 5, line 13, in Claim 14, delete "claim 13," and insert -- claim 13, wherein --, therefor.

Signed and Sealed this
Twenty-ninth Day of September, 2015

Michelle K. Lee
*Director of the United States Patent and Trademark Office*